United States Patent
Takeuti et al.

(10) Patent No.: US 6,746,160 B2
(45) Date of Patent: Jun. 8, 2004

(54) PRELIMINARY MEMBER OF OPTICAL DEVICE COMPONENT WITH OPTICAL FIBER

(75) Inventors: Hirokazu Takeuti, Otsu (JP); Nobuo Funabiki, Otsu (JP); Masanori Wada, Otsu (JP); Masanao Iida, Otsu (JP); Sotohiro Nakajima, Otsu (JP); Syojirou Horibe, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 09/917,856

(22) Filed: Jul. 31, 2001

(65) Prior Publication Data
US 2002/0039472 A1 Apr. 4, 2002

(30) Foreign Application Priority Data

| Jul. 31, 2000 | (JP) | ............... | 2000-231855 |
| May 23, 2001 | (JP) | ............... | 2001-154139 |
| May 23, 2001 | (JP) | ............... | 2001-154160 |
| Jun. 1, 2001 | (JP) | ............... | 2001-167050 |

(51) Int. Cl.$^7$ ............................................. G02B 6/36
(52) U.S. Cl. ............................. 385/84; 385/78; 385/80
(58) Field of Search ............................. 385/78, 80, 84, 385/85

(56) References Cited

U.S. PATENT DOCUMENTS

| 4,698,084 A | * | 10/1987 | Severijns et al. | ............. 65/412 |
| 4,743,084 A | * | 5/1988 | Manning | ............. 385/84 |
| 4,815,809 A | * | 3/1989 | Szostak | ............. 385/84 |
| 4,988,161 A | * | 1/1991 | Fujikawa et al. | ............. 385/68 |
| 4,994,134 A | * | 2/1991 | Knecht et al. | ............. 156/294 |
| 5,187,762 A | * | 2/1993 | Matsuura et al. | ............. 385/84 |
| 5,278,928 A | * | 1/1994 | Ueda et al. | ............. 385/78 |
| 5,305,413 A | * | 4/1994 | Payne | ............. 385/128 |
| 5,499,310 A | * | 3/1996 | Ueda | ............. 385/84 |
| 5,719,977 A | * | 2/1998 | Lampert et al. | ............. 385/60 |
| 5,790,732 A | * | 8/1998 | Ueda | ............. 385/84 |
| 6,190,055 B1 | * | 2/2001 | Andersen | ............. 385/80 |
| 6,450,696 B1 | * | 9/2002 | Omiya et al. | ............. 385/72 |
| 2001/0055449 A1 | * | 12/2001 | Sherrer | ............. 385/84 |

* cited by examiner

*Primary Examiner*—John D. Lee
(74) *Attorney, Agent, or Firm*—Arent Fox PLLC

(57) ABSTRACT

A preliminary member of an optical device component with optical fiber comprises a long capillary tube made of glass or crystallized glass and an optical fiber which is fixed in the inner hole of the long capillary tube with adhesive. The overall length of the preliminary member is a plurality of times that of the optical device component or more. A plurality of short capillary tubes with optical fibers are formed by cutting the preliminary member. Thereafter, by polishing both end faces of the short capillary tube with optical fiber, an optical device component can be obtained.

32 Claims, 10 Drawing Sheets

FIG.3 (A)
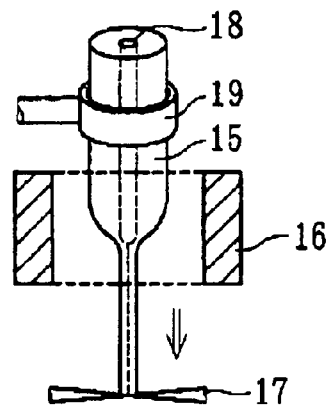
FIG.3 (B)
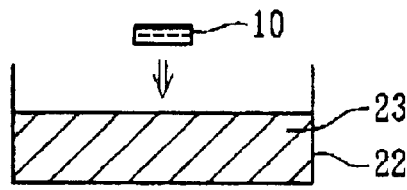
FIG.3 (C)               FIG.3 (D)
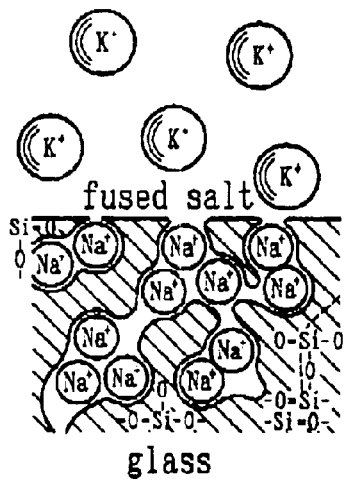    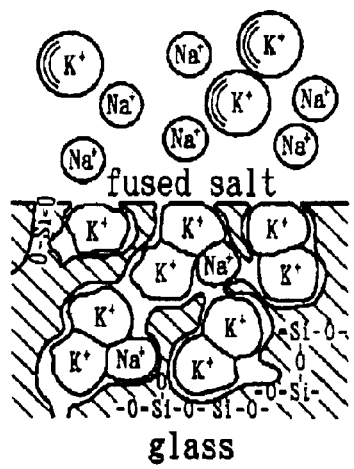

FIG.8 (A) (PRIOR ART)
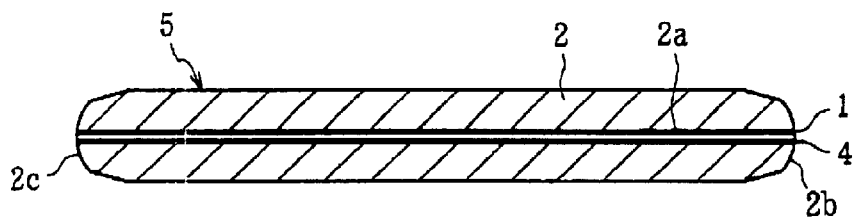
FIG.8 (B) (PRIOR ART)   FIG.8 (C) (PRIOR ART)
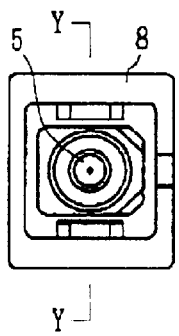 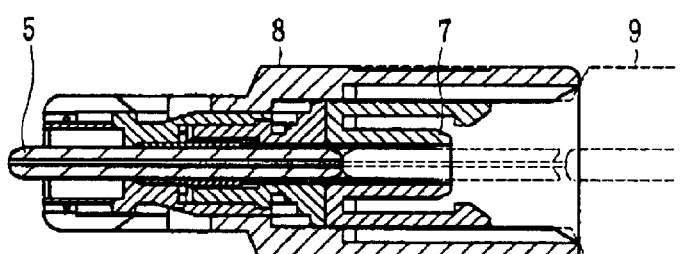
FIG.9 (PRIOR ART)
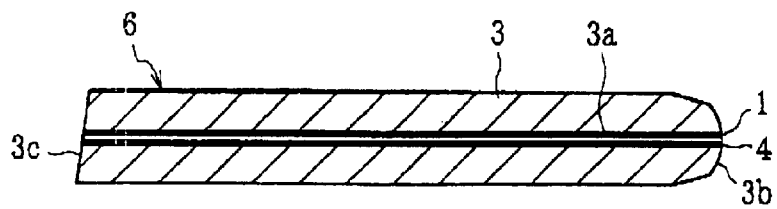

FIG.11 (A) (PRIOR ART)
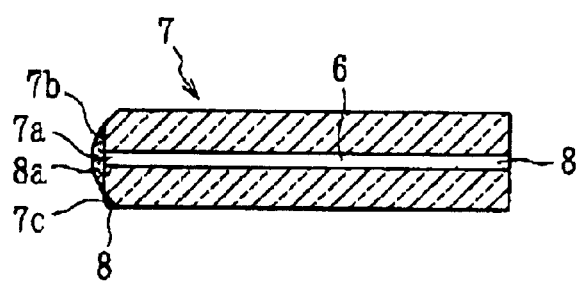
FIG.11 (B) (PRIOR ART)
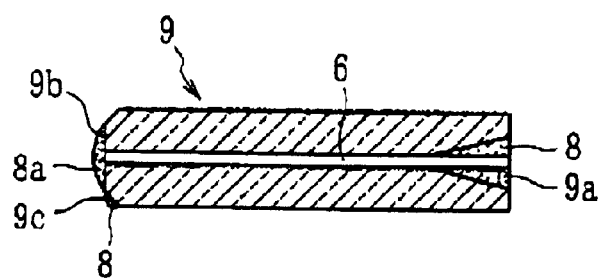

PRELIMINARY MEMBER OF OPTICAL DEVICE COMPONENT WITH OPTICAL FIBER

BACKGROUND OF THE INVENTION

The present invention relates to a preliminary member of an optical device component with optical fiber used to manufacture an optical device.

In recent years, with the rapid development of the optical communications network, high-quality and low-price optical devices have become necessary in bulk. In particular, in a plug type optical device or a receptacle type optical device with optical fiber built-in, a cylindrical optical device component in which an optical fiber is inserted into a precise capillary tube and fixed therein is used.

Priorly, as a component used in an optical device with optical fiber built-in, for example, an optical fixed attenuator, as shown in FIG. 8, an optical device component 5 is known, wherein an optical fiber 1 having a predetermined light signal attenuation factor is inserted into an inner hole 2a of a ceramic capillary tube 2 and fixed therein with an adhesive 4, and both end faces 2b and 2c are processed to become convex spherical surfaces. In addition, as a component used in an optical device which emits or receives light signals, an optical device component 6 as shown in FIG. 9 is known, wherein an optical fiber 1 is fixed in an inner hole 3a of a capillary tube 3 with the adhesive 4, one end 3b is processed to become a convex spherical surface, and a light emitting element such as a semiconductor laser is connected to the other end 3c which has been diagonally polished.

The cylindrical optical device component 5 with the optical fiber 1 fixed as shown in FIG. 8 and FIG. 9 has dimensional accuracy equivalent to that of a plug of an optical connector and is built in a housing 8 of an optical fixed attenuator provided with members having precisely aligning functions such as a receptacle 7 and a split sleeve. A plug end face of an optical connector 9 shown by a broken line, which has been processed to become a convex spherical surface, is butted against the end face of the optical device component 5 which has been processed to become a convex spherical surface in the housing 8 and physical contact (abbreviated as PC) connection where reflected light is suppressed on the connection end surface is achieved, whereby making it possible to transmit light signals at a high speed.

However, in assembly of the optical device components 5 and 6 shown in FIG. 8 and FIG. 9, the adhesive 4 is infected into the inner hole 2a having an inside diameter slightly greater than the optical fiber 1, thereafter a difficult operation is required such that while inserting the optical fiber, the adhesive 4 is uniformly filled in the gap between the inner hole 2a and optical fiber 1 so as not to create air bubbles and the like. Therefore, there is a problem in that skilled labor becomes necessary and since assembling capacity is in proportion to the number of workers, the cost becomes expensive.

In addition, in a case where a ceramic capillary tube is used as the optical device components 5 and 6 and the silica-based optical fiber 1 is fixed in the inner hole thereof, since the coefficient of linear expansion of the optical fiber 1 is $5\times10^{-7}$/K, while the coefficient of linear expansion of the ceramic capillary tube is $1.1\times10^{-5}$/K, that is greater by approximately two digits, protrusion and retraction phenomena occur on the end faces of the optical fiber 1 located at 2b, 2c, 3b, and 3c. With such phenomena, the intensity and phase of a light signal which propagates through the optical fiber 1 and other optical components connected thereto change, therefore, there is a problem in that connecting quality of the light signal is degraded.

In addition, in a case where a ceramic capillary tube is used as the optical device components 5 and 6, when the end faces thereof are polished for PC-connecting with an optical connector, since the polishing speed on the ceramic capillary tube is slower than the polishing speed of the optical fiber 1 made of silica glass, it is necessary to use expensive diamond films and to use slurry which contains special abrasive grains and the like and requires advanced technical skill accumulation for handling.

In addition, since the ceramic capillary tube barely allows light of 1000 nm or more to penetrate therethrough, it is impossible to perform a flaw inspection of the optical device components 5 and 6 with optical fiber inserted and fixed therein by means of laser beams within the infrared region of 1000 nm or more.

Furthermore, the ceramic capillary tube barely allows light with a wavelength of 350 nm–500 nm, whereby photo-curing adhesive generally cures, to penetrate therethrough. Therefore there is also a problem in that photo-curing adhesive having sensitivity for ultraviolet rays to blue visible rays cannot be used.

In addition, the side of the optical device 5 to be connected to an optical connector is inserted into an adapter of the optical connector. In a case where a split sleeve made of zirconia has been built in the said adapter, if the ordinary glass optical device 5 is inserted, there is a fear that the glass surface of the optical device 5 will be damaged and the strength will be seriously degraded In addition, it is necessary to insert the optical fiber whose covering has been removed in advance into the capillary tube, however, it is in practice difficult to almost completely remove the covering along the long length without breaking the fiber by means of an optical fiber stripper.

In addition, after the adhesive is filled into the capillary tube inner hole and the optical fiber is inserted, when the adhesive is cured, there is also a problem in that a contraction stress occurs in the adhesive and refractive index distribution of the optical fiber changes especially at the end portions of the long capillary tube.

In addition, after the adhesive is filed into the capillary tube inner hole and the optical fiber is inserted, when the adhesive is cured, there is also a problem in that the adhesive contracts and air bubbles generate.

For example, as shown in FIG. 10, in order to bring a light signal emitted from a laser diode 1 and condensed by the lens 2 into an optical fiber 4 inside an optical connector plug 3 or in order to condense a light signal emitted from the optical fiber 4 of the optical connector plug into a photodiode (not illustrated), a module as shown in the same drawing is used. In such a module, an optical fiber stub 5 with optical fiber 6 held in an inner hole 5a is used to bring in the light signal condensed by the lens 2 or for the signal to be emitted.

The end face 5b on the laser diode 1 (or photodiode) side of the optical fiber stub 5 is polished so that the end face 5b forms an angle of a few degrees with respect to the incident axis of the light signal to prevent reflected light from entering the laser diode 1 and becoming noise. Furthermore, the end face 5c on the other side is provided with a C-chamfer 5d on the peripheral portion to enable connection to an optical connector plug 3 and PC (a convex surface for physical contact) polishing around an optical fiber 6 as its center is provided.

These processes of the end faces 5b and 5c of the optical fiber stub 5 are performed, as shown in FIG. 11, by means of a special polishing device after the optical fiber 6 is fixedly fitted inside the inner hole 7a of a ferrule 7 composing the fiber stub 5 with adhesive 8.

However, the ferrule 7 has a shape shown in FIG. 11(A) and does not have a flare portion which guides the optical fiber 6 and eases insertion into the inner hole 7a. Therefore, in a case where the optical fiber stub 5 is assembled using the ferrule 7, adhesive 8 is injected into the inner hole 7a having an inside diameter slightly greater than the optical fiber 6, thereafter a difficult operation is required such that while looking through a microscope, the optical fiber 6 is carefully inserted and the adhesive 8 is uniformly filled in the gap between the inner hole 7a and optical fiber 6 so as not to create air bubbles and the like. Therefore, there is a problem in that skilled labor becomes necessary and since assembling capacity is in proportion to the number of workers, the cost becomes expensive.

Furthermore, inside the inner hole 7a of the ferrule 7, a flesh surface can be formed with accuracy when the base material is drawn, however, since the inside of the inner hole 7a is polluted with a cutting fluid, polishing materials, and glass powder due to the following cutting process and process of a C-chamfer 7c, the inside diameter of the inner hole 7a must be inspected. For this inspection, a penetration inspection is carried out by means of a pin gauge, however, since a flare portion is not provided either at this time, it takes time and labor to insert the pin gauge.

In the case of a ferrule 9 shown in FIG. 11(B), it is necessary to entirely polish off a flare portion 9a which has been formed, therefore the margin to be removed by polishing is large and polishing takes a long time. On the other hand, if the aperture diameter of the flare portion 9a is made small to shorten the time to remove the flare portion 9a, similar to the case of ferrule 7, insertion of the optical fiber 6 and pin gauge becomes difficult.

In addition, in the ferrules 7 and 9 of FIG. 11, when the optical fiber 6 is fixed with the adhesive 8, a adhesive heap 8a is respectively formed on the end faces 7b and 9b on the side where PC polishing is applied (since PC polishing becomes easy when a adhesive heap 8a is formed, the adhesive heap 8a is positively formed), If the outside diameter of the ferrules 7 and 9 is ø1.25 mm, the areas of the end faces 7b and 9b are small, the adhesive 8 oozes out onto the C-chamfers 7c and 9c, and it becomes necessary to tear off the fixedly adhered adhesive 8 from the C-chamfers after PC-polishing using a cutter knife and the like, and therefore, there is a problem in that the number of processing steps increases and the yield is degraded.

In addition, in a case where a ceramic capillary tube is used as the ferrules 7 and 9 and the optical fiber 6 is fixedly fitted in the inner hole, since the coefficient of linear expansion of the optical fiber 1 made of silica glass is approximately $5 \times 10^{-7}$/K, while the coefficient of linear expansion of the ceramic capillary tube is $1.1 \times 10^{-5}$/K, that is greater by approximately two digits, protrusion and retraction phenomena occur on the end faces of the optical fiber 6 located at 7b and 9b. With such phenomena, the intensity and phase of a light signal which propagates through the optical fiber 1 and other optical components connected thereto change and there is a problem in that connecting quality of the light signal is degraded.

In addition, in a case where a ceramic capillary tube is used as the ferrules 7 and 9 and the optical fiber 6 is fixed in the inner hole thereof, the ceramic capillary tube barely allows light with a wavelength of 350 nm–500 nm, whereby photo-curing adhesive generally cures, to penetrate therethrough. Therefore, there is also a problem in that photo-curing adhesive having sensitivity for ultraviolet rays to blue visible rays cannot be used.

In addition, in a case where a ceramic capillary tube is used as the ferrules 7 and 9 and the optical fiber 6 is fixed in the inner hole thereof, since the ceramic capillary tube barely allows light of 1000 nm or more to penetrate therethrough, it is impossible to perform a flaw inspection of the inside of the capillary tube with optical fiber 6 inserted and fixed by means of laser beams within the infrared region of 1000 nm or more.

SUMMARY OF THE INVENTION

It is an object of the present invention to provide a preliminary member which has sufficient mechanical strength and abrasion resistance, a coefficient of linear expansion which is approximate to that of the optical fiber, polishing characteristics which are approximate to those of the optical fiber, and infrared ray permeability, which can stably and accurately hold an optical fiber by means of a long capillary tube which can be manufactured by utilizing a drawing formation method at a low cost, and which can efficiently manufacture a highly reliable optical device component with optical fiber.

It is another object of the present invention to provide a method for manufacturing a preliminary member which can stably and accurately hold an optical fiber and which can efficiently manufacture a highly reliable optical device component with optical fiber It is still another object of the present invention to provide an optical fiber stub which can stably and accurately hold an optical fiber and which can be highly reliably and efficiently manufactured.

In order to achieve the abovementioned objects, the present invention provides a preliminary member of an optical device component with optical fiber which comprises a long capillary tube made of glass or crystallized glass and an optical fiber inserted and fixed in an inner hole of the capillary tube. The preliminary member will produce, by being cut, a plurality of short capillary tubes with optical fibers each of which composes an optical device component to be connected to an optical connector. According to the preliminary member of the present invention, an optical device component which can be easily butted to an optical connector can be efficiently manufactured.

Herein, the long capillary tube is made of glass or crystallized glass and comprises, for example, the inner hole and the outer circumferential surface having dimensional accuracy equivalent to that of a cylindrical ferrule for an optical connector. The optical fiber is fixed with an adhesive along almost the entire length of the inner hole of the long capillary tube. The long capillary tube with optical fiber has an overall length which is a plurality of times of a substantially cylindrical optical device component manufactured of a short capillary tube with optical fiber, In terms of the short capillary tube with optical fiber, a plurality of short capillary tubes with optical fiber are the same length with each other or the different lengths from each other.

In the above construction, the description that the long capillary tube comprises the inner hole and the outer circumferential surface having dimensional accuracy equivalent to that of a cylindrical ferrule for an optical connector means that it is possible to butt and connect portions having the same sectional dimensions to each other inside a cylinder having excellent straightness and, at the same time, it means that an optical connector having a special shape such as a bi-conical type where alignment is performed by latching on the conical surfaces is excluded. In addition, it is sufficient that the optical fiber is fixed with the adhesive along almost the entire length of the inner hole of the long capillary tube, and there is a case where the end portion of the optical fiber is positioned slightly inside the end face of the long capillary tube and also a case where the end portion of the optical fiber is slightly protruded out side the end face of the long capillary tube. Since the end portion of the capillary tube is processed later, in the former case, the end portion of the capillary tube where the optical fiber does not exist is removed through a post-process and in the latter case, the optical fiber which is protruded from the end portion of the capillary tube is removed by a post-process, and thus causing no problem.

In addition, when the preliminary member has an overall length of 20 mm or more, a plurality of optical device components manufactured from a capillary tube with optical fiber having an overall length less than 10 mm can be obtained. In addition, the reserve material preferably has an overall length of 500 mm or less since the adhesive can be easily and uniformly filled into the inner hole of the capillary tube and uniform thermal treatment can be performed using an existing heating chamber.

In addition, when the long capillary tube is made of glass or crystallized glass having a coefficient of linear expansion below $7 \times 10^{-6}$/K, the intensity, phase, and polarized condition of a light signal which propagates through the held silicon-based optical fiber and another optical component do not change with changes in temperature such as air temperature and the high connecting quality of the light signal can be maintained.

In addition, when the long capillary tube is made of glass or crystallized glass which allows, at a thickness of 1 mm, light with a wavelength of 350 nm–500 nm to penetrate therethrough at 50% or more and the adhesive is an ultraviolet curing type, it becomes possible to fix the optical fiber in a short time so that the assembly cost can be reduced. On the other hand, if the capillary tube has a transmittance less than 50% with respect to the light with a wavelength of 350 nm–500 nm, it takes time to cure the adhesive and there is little merit in using a heat-curing type adhesive.

In addition, the long capillary tube has a composition of 55–72% of $SiO_2$, 16–30% of $Al_2O_3$, 1.5–2.8% of $Li_2O$, 0–2.5% of MgO, 1.3–5.0% of $TiO_2$, 0–4% of $ZrO_2$, 2.0–9% of $TiO_2+ZrO_2$, 2.1–10% of $K_2O$, 0–10% of ZnO, 0–6% of BaO, 0–4% of CaO, 0–7% of $B_2O_3$, 0–4% of $Na_2O$, 0–0.9% of $P_2O_5$, 0–3% of $As_2O_3$, and 0–3% of $Sb_2O_3$ based on percentage by mass, and preferably consists of crystallized glass where a β-spodumene solid solution or a β-silica solid solution has been deposited at 30–70% by volume as the main crystals.

$SiO_2$ contained in the above-described crystallized glass is not only a chief component of glass but also a crystalline component and the content thereof is 55–72%, preferably, 62–68.5%. If $SiO_2$ is contained with less than 55%, crystallized glass having a uniform structure cannot be obtained, while if $SiO_2$ is more than 72%, the softening point of the crystallized glass becomes high and meltability when the glass is melted becomes poor, thus resulting in an ununiform condition. Therefore, partial devitrification is likely to occur and drawing formability significantly lowers.

$Al_2O_3$ is also a crystalline component and the content thereof is 16–30%, preferably, 17–24%. If $Al_2O_3$ is less than 16%, the crystals become rough and large. Accordingly, elongation during drawing formation is lower and the crystals protrude from the surface, causing devitrificated glass. On the other hand, if $Al_2O_3$ is contained with more than 30%, devitrification is likely to occur during drawing formation.

$Li_2O$ is an essential component as a component of crystals and the content thereof is 1.5–2.8%, preferably, 1.8–2.5%. If $Li_2O$ is less than 1.5%, uniformly crystallized glass is hardly obtained, while if $Li_2O$ is more than 2.8%, crystallinity becomes too strong. Accordingly, the amount of deposited crystals becomes too great and the ratio of a glass phase becomes insufficient, therefore softening becomes difficult, and during the drawing formation process, crystallization easily progresses and the devitrificating characteristics become serious.

$K_2O$ is an essential component to control the crystallinity and has significant effects on the ratio of the glass phase and the softening point, and the content thereof is 2.1–10%, preferably, 2.5–7%. If $K_2O$ is less than 2.1%, crystallinity becomes too strong and the ratio of a glass phase becomes insufficient, and during the drawing formation process, crystallization easily progresses. Also, the softening point of the crystallized glass becomes high. On the other hand, if $K_2O$ exceeds 10%, the crystallized glass is hardly obtained.

$TiO_2$ is a component which acts as a nucleating agent during crystallization, and the content thereof is 1.3–5%, preferably, 1.5–4.5%. If $TiO_2$ is less than 1.3%, the crystals becomes rough and large and the drawing formation becomes difficult, while it $TiO_2$ is more than 5%, heterologous crystals are deposited in large quantities and it becomes impossible to obtain desired characteristics.

Similar to $TiO_2$, $ZrO_2$ is a component which acts as a nucleating agent during crystallization, and the content thereof is 0–4%, preferably, 0.5–3%. If $ZrO_2$ is more than 4%, melting of the glass becomes difficult and the devitrificating characteristics of the glass become serious.

In addition, the total amount of $TiO_2$ and $ZrO_2$ is 2–9%, preferably, 3–6%. If the total amount of both is less than 2%, fine crystals are hardly obtained, while if it exceeds 9%, the glass is likely to become ununiform.

ZnO is a component which lowers the softening point of the crystallized glass, and the content thereof is 1–10%, preferably, 2–6%. If ZnO is less than 1%, the softening point of the crystallized glass is likely to become high, while if it is more than 10%, stability of the crystalline phase lowers.

MgO is a component which lowers the softening point of the crystallized glass and composes crystals, and the content thereof is 0–2.5%, preferably, 0–2%. If MgO is more than 2.5%, crystallinity becomes too strong and the thermal expansion coefficient becomes too great.

CaO is a component which lowers the softening point of the crystallized glass and composes crystals, and the content thereof is 0–4%, preferably, 0–2%. If CaO is more than 4%, heterologous crystals are deposited in large quantities.

BaO is a component which lowers the softening point of the crystallized glass and composes crystals, and the content thereof is 0–6%, preferably, 0–3%. If BaO is more than 6%, heterologous crystals are deposited in large quantities.

$B_2O_3$ is also a component which lowers the softening point of the crystallized glass and composes crystals, and the content thereof is 0–7%, preferably, 0–4%. If $B_2O_3$ is more than 7%, heterologous crystals are deposited in large quantities.

$Na_2O$ is a component which promotes melting of the glass, and the content thereof is 0–4%, preferably, 0–2%. If $Na_2O$ is more than 4%, heterologous crystals are deposited in large quantities.

$P_2O_5$ has an effect to make crystals fine and the content thereof is 0–0.9%, preferably, 0–0.7%. If $P_2O_5$ is more than 0.9%, the devitrificating characteristics become serious.

$As_2O_3$ and $Sb_2O_3$ can be contained with no more than 3%, as a clarifier, respectively, and preferably contained with no more than 1.5%, respectively.

In addition to the above, $SnO_2$, PbO, $Bi_2O_3$ and the like can be added within the range where the total amount thereof does not exceed 5%.

The crystallized glass having the abovementioned composition is low expansion crystallized glass where aβ-spodumene solid solution or a β-silica solid solution have been deposited as the main crystals. Such deposited crystals are not limited to these two types but, as long as the desired characteristics are not damaged, there is no problem even if heterologous crystals such as gahnite and the like have been deposited.

When the crystallized glass having such a composition is used for a long capillary tube, it becomes possible to consecutively manufacture capillary tubes by means of a drawing formation technique, therefore, the long capillary tubes which compose preliminary members can be obtained in bulk with high accuracy by the drawing formation.

In addition, owing to effects of the crystals which have been deposited on the surface, the long capillary tube made of such crystallized glass has sufficient abrasion resistance even when used as an optical connector, and when the capillary tube is repeatedly inserted and withdrawn into and from an adapter with a zirconia split sleeve material, characteristics and optical characteristics do not change at all. The same applies to a case where the capillary tube is used in a mode of the optical device component 5.

In addition, with respect to the long capillary tube made of such crystallized glass, the polishing speed is close to that for an optical fiber compared to ceramic such as zirconia and it is unnecessary to employ a polishing method using expensive diamond polishing films or special slurry, whereby the polishing costs can be reduced.

In addition, such crystallized glass allows, at a thickness of 1 mm, light of 700 nm–2500 nm to penetrate therethrough at 30% or more, therefore, faults in the preliminary member with optical fiber inserted can be detected by means of an infrared camera and infrared laser beams. In particular, light of 1300 nm or more is penetrated at 60% or more. Lasers which are generally used for transition mainly have wavelengths of 1310 nm and 1550 nm.

In addiction, when a flare portion to guide an optical fiber is formed at the end portion of the inner hole of the long capillary tube, it becomes possible to easily insert a long optical fiber with adhesive into the inner hole of the long capillary tube along almost the entire length of the inner hole and fix the optical fiber with the adhesive stably.

In addition, when a case where the long capillary tube made of glass or crystallized glass is constructed by generating a compressive stress layer on the surface thereof and enhancing mechanical strength, even when some scratches and the like are produced due to machine processing, the long capillary tube does not break or chip when a severe thermal shock is applied or an external stress is applied during handling, thus making it possible to handle easily. In addition, it is possible to improve repeated insertability and withdrawability of the optical device component manufactured using the preliminary member with respect to the adapter with a zirconia split sleeve. When the compressive force layer is generated on the surface of the capillary tube by an ion exchanging treatment, the capillary tube made of glass or crystallized glass containing ions of alkali elements such as Li, Na and the like can be used, and as the glass, borosilicate glass and lithium, alumina, and silicate-based crystallized glass are suitable. Furthermore, since the capillary tube made of glass or crystallized glass which appropriately contains alkali ions can be manufactured by drawing formation using a glass drawing technique, manufacturing costs can be reduced.

In addition, when the capillary tube has a polygonal-columnar shape, by diagonally polishing the edge thereof while taking a side of the polygonal-columnar shape as a standard, the diagonally polished direction can be easily confirmed during assembly, therefore assembly can be easily carried out. In order to form a polygonal-columnar shape, a preform to be drawn is processed into a polygonal shape beforehand and the preform is drawn while maintaining the shape thereof, or a cylindrical capillary tube may be processed after drawing formation.

In either case where a partial circumference on the outer periphery of the capillary tube is flatly scraped away in the longitudinal direction or where groove processing is performed on a partial circumference in the longitudinal direction, the same effects as those of the above case of the polygonal shape can be provided. Such capillary tubes can be manufactured by either drawing formation or post processing.

Furthermore, when the optical device component is a member of an optical fixed attenuator and the optical fiber has a predetermined optical attenuation factor, by using the preliminary member with optical fiber, it becomes possible to manufacture the optical fixed attenuator more efficiently than the prior art.

According to the preliminary member of the present invention, it is possible to accurately and stably position the optical fiber at a position where it can be connected by butting to the optical connector and excellent effects can be provided in practical use such that handling is easy and a highly reliable optical device component using the optical fiber can be efficiently manufactured.

Furthermore, when the preliminary member is made of crystallized glass having the abovementioned composition, the capillary tubes can be manufactured in series by means of the drawing formation. Accordingly, the short capillary tube with optical fiber, which has sufficient mechanical strength and abrasion resistance, thermal expansion coefficient approximate to that of an optical fiber, polishing characteristics approximate to those of an optical fiber, and infrared ray permeability and composes an optical device to be connected to an optical connector, can be manufactured at low cost.

Furthermore, when crystallized glass which allows, at a thickness of 1 mm, light of 700 nm–2500 nm to penetrate therethrough at 30% or more is used, a flaw inspection after insertion of the fiber can be performed by utilizing an infrared camera or infrared laser beams.

Moreover, in order to achieve the above object, the present invention provides a method for manufacturing a preliminary member of an optical device component with optical fiber comprising the steps of manufacturing a long capillary tube by forming softened glass or crystallized glass, providing a substantially conical flare portion at an end portion of the long capillary tube for guiding an optical fiber to an inner hole of the long capillary tube, filling an adhesive into the inner hole of the long capillary tube, inserting a long optical fiber whose covering has been removed into the inner hole through the flare portion, and curing the adhesive to fix the optical fiber in the long capillary tube. The preliminary member thus manufactured according to the manufacturing method of the present invention will produce, by cutting, a plurality of short capillary tubes with optical fibers each of which composes an optical device component connected to an optical connector. According to the present invention, the preliminary member, from which a plurality of optical device components with optical fibers such as members for an optical fixed attenuator each of which can be easily butted to an optical connector, can be efficiently manufactured.

In the present invention, in a case where a long capillary tube is manufactured by forming softened glass or crystallized glass, the long capillary tube may be manufactured by drawing a tubular base material made of precisely processed glass or crystallized glass, or the long capillary tube may be manufactured by accurately forming melted glass or crystallized glass.

In the present invention, the long capillary tube comprises, for example, an inner hole and outer circumferential surface having dimensional accuracy equivalent to that of a cylindrical ferrule for an optical connector, and it is possible to connect the portions having approximately the same section area by butting with each other inside a cylinder having excellent straightness. Herein, connection to an optical connector having a special shape such as a bi-conical type where alignment is performed by latching on the conical surfaces is not included. The long capillary tube has an overall length from which a plurality of short capillary tubes with optical fibers for manufacturing substantially conical optical device components are obtained. In such a case, the plurality of short capillary tubes may have a single length or several lengths.

In addition, it is sufficient that the long optical fiber is fixed with the adhesive along almost the entire length of the inner hole of the long capillary tubes It is unnecessary that the optical fiber is fixed to the front end portion of the long capillary tube that is to be removed later by processing. Also, if the optical fiber is slightly protruded from the end face, there is no problem.

In addition, if the overall length of the long capillary tube is 20 mm or more, a plurality of optical device components manufactured from the short capillary tubes with optical fibers each of which has the overall length less than 10 mm can be obtained In addition, the overall length of the long capillary tube is preferably 500 mm or lower since the adhesive can be easily and uniformly filled into the inner hole and heat treatment can be uniformly performed in an existing heating furnace.

In addition, in a case where the a compressive stress layer is formed on the outer surface of the long capillary tube to enhance the mechanical strength thereof, even when some scratches and the like are produced due to machine processing, the long capillary tube does not break or chip when a severe thermal shock is applied or an external stress is applied during handling, thus making it possible to handle easily.

In a case where the compressive stress layer is formed on the surface of the long capillary tube by a quenching method, although reinforcement is not improved to a high extent, the strength can be stably improved with little unevenness.

When the compressive force layer is formed on the surface of the capillary tube by an ion exchanging treatment, the reinforcement is improved to a high extent. As the capillary tube to undergo ion exchanging treatment, a tube made of glass or crystallized glass containing ions of alkali elements such as Li, Na and the like can be used, and as the glass, borosilicate glass and lithium, alumina, and silicate-based crystallized glass which have relatively high toughness are suitable.

In addition, in order to form the substantially conical flare portion, by cutting the end face of the long capillary tube around the axis of the inner hole with a rotating tool whose front end is provided with sintered abrasive grains and has the angle of 45–120°, the flare portion can be effectively formed by machining.

In addition, in order to form the substantially conical flare portion, by immersing the end portion of the long capillary tube into a glass-erosive agent while protecting the outer surface of the long capillary tube, the flare portion which, without steps, continues to the inner hole filled with adhesive of the long capillary tube can be effectively formed, thus making it possible to smoothly insert the optical fiber therein.

In addition, when the adhesive is filled into the inner hole of the long capillary tube, an adhesive heap essentially including no air bubbles and filling at least the flare portion may be formed. This adhesive heap is provided so that when the optical fiber is inserted, the optical fiber becomes wet with adhesive sufficiently before reaching the inner hole from the flare portion of the long capillary tube and a layer of adhesive at an amount sufficient to avoid catching air bubbles into the inner hole is formed on the end face on the flare portion side. For example, by directly applying the adhesive on the flare portion formed at the end face of the long capillary tube, it becomes possible to reduce air bubbles caught into the inner hole. Moreover, by holding the adhesive heap with a transparent member and inserting the optical fiber into the inner hole of the long capillary tube while observing the optical fiber, catching of air bubbles and foreign matter can be securely reduced.

In addition, the surface of the long optical fiber whose covering has been removed may be cleaned. In this case, heat cleaning wherein by further exposing the surface of the long optical fiber whose covering has been removed in an atmosphere of about 500° C. to burn and blow off the adhering organic matter, acid cleaning is performed wherein the surface is immersed into a washing solution, alkali cleaning, or the like may be performed. Thus, the residue of the covering on the optical fiber surface is almost completely removed, wettability with respect to the adhesive is improved, and catching of foreign matter and air bubbles can be reduced.

In addition by butting the end portion of the long capillary tube to one end of the capillary tube having a substantially conical flare portion on the other end inside a split sleeve to align the inner hole of the long capillary tube with an inner hole of the capillary tube having the flare portion, the flare portion can be fixed to the end portion of the long capillary tube. According to such construction, the flare portion can be provided without processing the long capillary tube and furthermore, the capillary tube having a substantially conical flare portion at the other end thereof and the split sleeve can be repeatedly used.

In addition, the long capillary tube is made of glass or crystallized glass which allows, at a thickness of 1 mm, light having a wavelength of 350 nm–500 nm to penetrate therethrough at 50% or more, the photo-curing adhesive is filled into the inner hole of the long capillary tube, and after the long optical fiber whose covering has been removed is inserted into the inner hole through the flare portion, the adhesive is cured by exposure to light, and thus the optical fiber can be fixed in the long capillary tube. According to such construction, the optical fiber can be fixed in a short time, therefore assembly costs can be reduced.

In addition, heat-curing adhesive is filled in the inner hole of the long capillary tube, the long optical fiber whose covering has been removed is inserted into the inner hole through the flare portion, and then the adhesive is cured by heating, whereby the optical fiber can be fixed in the long capillary fiber. According to such construction, the preliminary member with optical fiber can be manufactured using heat-curing adhesives which have shown results for many years such as epoxy-based adhesive. In such a case, for example, when the adhesive which cures by being maintained at 100° C. for one hour or more is used, the adhesive is maintained at 20–70° C. for five hours or more and cured at 100° C. or more and during the time of temperature-fall, the adhesive is maintained at 70–20° C. for one hour or more. Thus, the contraction stress and the creation of air bubbles generated when the adhesive cures can be reduced.

In addition, the long capillary tube is made of glass or crystallized glass which allows, at a thickness of 1 mm, light having a wavelength of 700 nm–2500 nm to penetrate therethrough at 30% or more, light having a wavelength 700 nm–2500 nm is irradiated to the long capillary tube with the optical fiber fixed with the adhesive in the inner hole thereof, and transmitted light or a transmitted image therethrough is observed, whereby a adhering failure in the optical fiber is inspected. According to such construction, the preliminary member can be easily inspected without contact.

In addition, in order to achieve the above object, the present invention provides an optical fiber stub manufactured by a manufacturing method comprising the steps of forming softened glass or crystallized glass into a long capillary tube, inserting and fixing a long optical fiber into an inner hole of the long capillary tube along almost the entire length of the inner hole to manufacture a long capillary tube with optical fiber, cutting the long capillary tube with optical fiber into a plurality of first capillary tubes with optical fibers each of which has a predetermined length, and polishing end faces of the first capillary tube with optical fiber. The optical fiber stub of the present invention is connected to an optical connector. According to the present invention, since the inside of the inner hole of the long capillary tube is not polluted and maintains a clean surface at the state of forming, a step for carrying out a pin-gauge inspection of the inner hole of the capillary tube becomes unnecessary, the number of operations to insert the adhesive and optical fiber into the inner hole of the capillary tube considerably decreases, and a step for removing the oozed adhesive is also eliminated, thus assembling steps of the optical fiber stub can be significantly reduced compared to the prior art.

In the present invention, in a case where the softened glass or crystallized glass is formed into a long capillary tube, such a long capillary tube may be manufactured by drawing a tubular base material made of precisely processed glass or crystallized glass or a long capillary tube may be manufactured by precisely forming melted glass or crystallized glass. The long capillary tube has an overall length from which a plurality of short capillary tubes with optical fiber to manufacture substantially cylindrical optical device components can be obtained. In such a case, the plurality of short capillary tubes may have a single length or several lengths.

In addition, when the overall length of the long capillary tube is 20 mm or more, a plurality of optical device components manufactured from the capillary tubes with optical fibers whose overall length is less than 10 mm can be obtained. In addition, the overall length of the long capillary tube is preferably 500 mm or lower since the adhesive can be easily and uniformly filled into the inner hole and heat treatment can be uniformly performed in an existing heating furnace.

The optical fiber stub of the invention comprises, for example, an inner hole and an outer circumferential surface having dimensional accuracy equivalent to that of a cylindrical ferrule for an optical connector, and it is possible to connect the portions having approximately the same section area by butting with each other inside a cylinder having excellent straightness. Herein, connection to an optical connector having a special shape such as a bi-conical type where alignment is performed by latching on the conical surfaces is not included.

As a long optical fiber fixed in the long capillary tube, a silica-based optical fiber and the like used for high-speed optical communications can be used, and it is sufficient that the optical fiber is fixed with the adhesive along almost the entire length of the inner hole of the long capillary tube. It is unnecessary that the optical fiber is fixed to the front end portion of the long capillary tube that is to be removed later by processing or if the optical fiber is slightly protruded from the end face, there is no problem.

In addition, the end face of the first capillary tube with optical fiber may be PC-polished. Thus, the optical fiber stub is PC-connected to an optical connector plug, whereby reflection of an optical signal is prevented and manufacturing becomes efficient compared to the prior art.

In addition, one end face of the first capillary tube with optical fiber may be PC-polished and the other end face may be polished so as to be an inclined surface which forms an angle of 0–30° with respect to a surface perpendicular to the center axis. Thus, the optical fiber stub can prevent a laser diode or a photodiode from reflecting a light signal and PC-connect to the optical connector plug, and manufacturing becomes efficient compared to the prior art.

In addition a construction may be employed, wherein after both end faces of the first capillary tube with optical fiber are PC-polished, the first capillary tube with optical fiber is cut at inclined surfaces which forms an angle of 0–30° with respect to a surface perpendicular to the center axis to form second and third capillary tubes with optical fibers each of which has a predetermined length, and the inclined surfaces of the second and third capillary tubes with optical fibers are polished. Thus, it becomes possible to effectively use the long capillary tube without waste and polish the other end face of the capillary tube with optical fiber in a short time.

The long capillary tube having a coefficient of linear expansion of less than $7 \times 10^{-7}$/K is used, whereby the optical fiber stub can maintain high connecting quality of an optical fiber without occurrence of changes in the intensity and phase of a light signal which propagates through the held silica-based optical fiber and other optical components, and manufacturing becomes efficient compared to the prior art.

In addition, the compressive stress layer is formed on the outer surface of the long capillary tube so that the mechanical strength is enhanced, thus even when some scratches and the like are produced due to machine processing, the long capillary tube does not break or chip when a severe thermal shock is applied or an external stress is applied during handling, thus making it possible to handle easily.

In a case where the compressive stress layer is formed on the surface of the long capillary tube by a quenching method, although reinforcement is not improved to a high extent, strength can be stably improved with little unevenness.

When the compressive force layer is formed on the surface of the capillary tube by an ion exchanging treatment, reinforcement is improved to a high extent. As the capillary tube to undergo the ion exchanging treatment, a tube made of glass or crystallized glass containing ions of alkali elements such as Li, Na and the like can be used, and as the glass, borosilicate class and lithium, alumina, and silicate-based crystallized glass which have relatively high toughness are suitable.

In addition, the long capillary tube made of glass or crystallized glass which allows, at a thickness of 1 mm, light having a wavelength of 350 nm–500 nm to penetrate therethrough at 50% or more is used, after the photo-curing adhesive is filled into the inner hole of the long capillary tube, the long optical fiber is inserted along almost the entire length, the adhesive is cured by exposure to light, and the optical fiber can be fixed in the long capillary tube, thus making it possible to insert the long optical fiber in a short time and assembling time of the optical fiber stub can be significantly shortened.

In addition, the long capillary tube made of glass or crystallized glass which allows, at a thickness of 1 mm, light having a wavelength of 700 nm–2500 nm to penetrate therethrough at 30% or more is used, light having a wavelength 700 nm–2500 nm is irradiated to the long capillary tube with the optical fiber fixed with the adhesive in the inner hole thereof, and transmitted light or a transmitted image therethrough is observed, whereby a adhering failure in the optical fiber is inspected, making it possible to easily inspect the preliminary member without contact.

As described above, according to the present invention, steps to manufacture an optical fiber stub can be significantly reduced compared to the prior art.

BRIEF DESCRIPTION OF THE DRAWINGS

FIG. 2 are explanatory views when an optical device component is manufactured using the preliminary member of FIG. 1, wherein FIG. 2(A) is a section of the capillary tube with optical fiber which has been cut from the preliminary member by a predetermined length, FIG. 2(B) is a section of the capillary tube with optical fiber whose end faces have been chamfered, and FIG. 2(C) is a section of the optical device component.

FIG. 3 are explanatory views of a manufacturing method of the preliminary member, wherein FIG. 3(A) is an explanatory view of drawing formation of glass or crystallized glass, FIG. 3(B) is an explanatory view of ion exchanging treatment, FIG. 3(C) is a view showing a condition before ion exchange, and FIG. 3(D) is a view showing a condition after ion exchange.

FIG. 4 are explanatory views for providing a flare portion for insertion of an optical fiber at the end portion of a long capillary tube, wherein FIG. 4(A) is an explanatory view for forming a substantially conical flare portion at the end portion of the long capillary tube by means of a tool with diamond abrasive grains sintered, FIG. 4(B) is an explanatory view for fitting and providing substantially conical flare portions at the end portions of a long capillary tube by press-fitting a capillary tube having a substantially conical flare portion on one end thereof from both ends of a split sleeve, respectively, and butting the capillary tubes with each other, and FIG. 4(C) is an explanatory view of a step for forming a substantially conical flare portion at the end portion of a long capillary tube by etching.

FIG. 5 are explanatory views for fixedly fitting an optical fiber into a long capillary tube, wherein FIG. 5(A) is an explanatory view for filling adhesive in a long capillary tube, FIG. 5(B) is an explanatory view for inserting an optical fiber into the long capillary tube of FIG. 5(A), FIG. 5(C) is an explanatory view for curing adhesive, and FIG. 5(D) is an explanatory view for adhering an optical fiber.

FIG. 6 are explanatory views for filling adhesive in the flare portion of a long capillary tube and inserting an optical fiber therein, wherein FIG. 6(A) is an explanatory view for piling adhesive on the flare portion and inserting an optical fiber in the long capillary tube and FIG. 6(B) is an explanatory view for holding adhesive with a transparent member and inserting an optical fiber into the long capillary tube.

FIG. 7 are explanatory views when an optical fiber stub is manufactured by means of a long capillary tube with optical fiber, wherein FIG. 7(A) is an explanatory view of a capillary tube with optical fiber which has been cut from a long capillary tube with optical fiber by a predetermined length, FIG. 7(B) is an explanatory view of a capillary tube with optical fiber whose end faces have been chamfered, FIG. 7(C) is an explanatory view of a member With optical fiber, FIG. 7(D) is an explanatory view for cutting a member with optical fiber, and FIG. 7(E) is an explanatory view for an optical fiber stub.

FIG. 8 are explanatory views of an optical fiber device component used for an optical fixed attenuator, wherein FIG. 8(A.) is an explanatory view of an optical device component, FIG. 8(B) is a view of the end face of an optical fixed attenuator with an optical device component built in, FIG. 8(C) is a section along Y—Y of FIG. 8(B).

FIG. 9 is an explanatory view of another optical device component.

FIG. 11(A) is an explanatory view of a manufacturing method of the prior-art optical fiber stub. FIG. 11(B) is another explanatory view of a manufacturing method of the prior-art optical fiber stub.

DESCRIPTION OF THE PREFERRED EMBODIMENTS

Hereinafter, embodiments of the present invention will be described with reference to the drawings.

Figure 1:
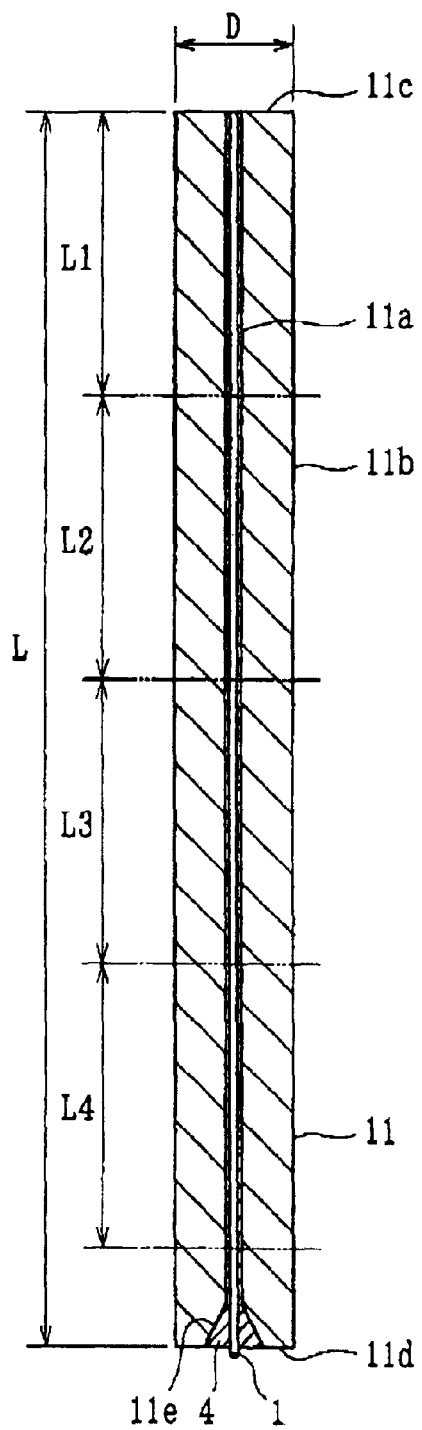
FIG. 1 shows a section of the preliminary member according to the embodiment.

FIG. 1 shows a preliminary member of an optical device component with optical fiber according to the embodiment. An optical fiber 1 is inserted in an inner hole 11a of a long capillary tube 11 made of glass or crystallized glass and fixed with an adhesive 4. The optical fiber 1 comprises a core portion with metal elements doped and has a predetermined light attenuation factor per unit length.

The preliminary member according to the embodiment comprises the capillary tube 11 which is provided with the inner hole 11a having dimensional accuracy equivalent to that of a substantially cylindrical ferrule for an MU-type or LC-type optical connector having a nominal diameter D of 1.25 mm and an outer circumferential surface 11b and has, for example, an overall length L of 250 mm that is a plurality of times of an optical device component having an overall length of L1, L2, L3, L4 or the like and the optical fiber 1 which is inserted in the inner hole 11a of the said capillary tube 11 and fixed with the epoxy-based adhesive 4.

For example, a preform made of crystallized glass having the composition shown in Table 1 is formed by drawing while heating at a temperature of the softening point or higher, a long capillary tube is continuously formed, and the capillary tube is cut if necessary, thus the capillary tube 11 is obtained.

Ion exchanging treatment is further performed on the capillary tube 11 and a compressive stress layer is formed on the surface thereof. The outside diameter of the capillary tube 11 has high circularity with a dimension of 1.249 mm±0.5 $\mu$m, the inner hole 11a is 126 $\mu$m+1/–0 $\mu$m while the silica-based optical fiber has a diameter of 125 $\mu$m and the concentricity is within 1 $\mu$m, and an exposed face of the optical fiber 1 can be accurately positioned and held on the end face 11c. A substantially conical flare portion 11e to guide the optical fiber 1 and make insertion easy is formed in the end face 11d of the capillary tube 11.

The capillary tube 11 is made of borosilicate glass which contains $Na_2O$ at approximately 5% by mass and has an expansion coefficient of $5 \times 10^{-6}$/K and Vickers hardness of 680 kg/mm$^2$, and allows, at a thickness of 1 mm, light having a wavelength of 350 nm–500 nm to penetrate at 80% or more, and may have a compressive stress layer formed on the surface thereof by an ion exchanging treatment.

Figure 2:
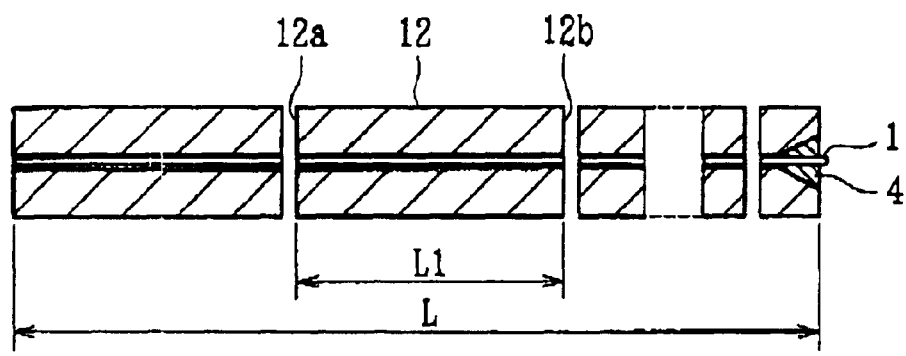
Figure 2:
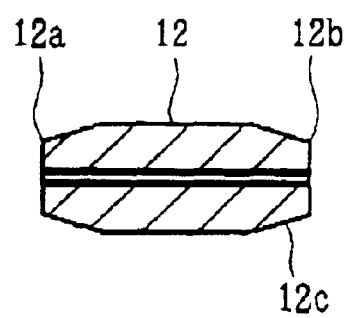
Figure 2:
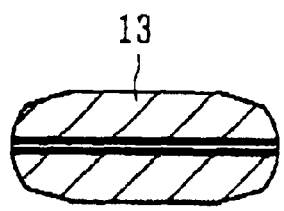

In an example where an optical fixed attenuator is manufactured using the above preliminary member, as shown in FIG. 2, a preliminary member having the overall length 250 mm is cut and, for example, 12 capillary tubes with optical fibers having the overall length L1 of approximately 20 mm where a light signal having a wavelength 1.3 $\mu$m which penetrates through the optical fiber is attenuated by 10 dB are manufactured. Thereafter, a chamfer 12c having a predetermined shape is provided on both end surfaces 12a and 12b of each capillary tube with optical fiber 12 and the end faces are then polished into convex spherical surfaces, thus an optical device component 13 can be obtained. The optical device component 13 thus obtained is incorporated in a housing provided with members having precisely aligning functions such as a split sleeve and a receptacle and accordingly becomes an optical fixed attenuator.

Then, an example method for manufacturing the aforementioned preliminary member will be described.

FIG. 3 are explanatory views of drawing formation of glass or crystallized glass and an ion exchanging treatment.

When the long capillary tube 11 is manufactured, first, as shown in FIG. 3(A), a preformed body 15 made of glass or crystallized glass having a hole 18 in its center, for example, made of crystallized glass having any composition shown in Table 1 is manufactured. Then, the preformed body 15 is attached to a drawing formation device 19 and heated in an electric furnace 16. The drawing formation body which has exited from the furnace is stretched with a drive roller (not illustrated) and drawn and formed into a glass capillary tube 10 with an inner hole while it is controlled to be a predetermined section size and shape. After drawing formation, the glass capillary tube 10 is cut at a length of approximately 250 mm by a cutter 17.

In a case where the compressive stress layer is formed on the surface of the long capillary tube 11 by the quenching method, by splaying cold blasts or refrigerant, the glass capillary tube 10 having a predetermined section size and shape which has exited from the furnace is quenched, whereby the compressive stress layer is generated on the glass surface.

Alternatively, in a case where reinforcement is performed by the ion exchanging, as shown in FIG. 3(B), the approximately 250 mm glass capillary tube 10 is immersed in fused salt 23 of $KNO_3$ kept at approximately 400° C. in an ion exchanging tank 22 for approximately ten hours. Thereafter, $KNO_3$ is removed by cleaning. Thus, the capillary tube having deflection strength due to 3-point bending as mechanical strength which has increased by two times or more compared to that of an untreated capillary tube is obtained. In this ion exchanging treatment, glass in a condition of FIG. 3(C) is changed into a condition of FIG. 3(D) by substituting alkali ions (Na+) in the glass with alkali ions (K+) having a greater ion diameter at a temperature lower than the annealing temperature, whereby a strong compressive stress layer is generated on the glass surface and practical strength is increased. By performing as such, such characteristics can be obtained in that (1) strength which is two times or more than that by air blast quenching-reinforcement can be obtained, (2) the shape and thickness are not restricted, (3) since deformation does not occur, a high dimensional accuracy can be obtained, (4) even a small piece whose test piece is difficult to be maintained can be made available, and (5) unlike a protective film, peeling does not occur.

Figure 4:
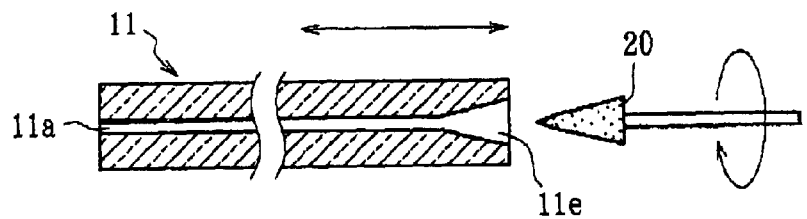
Figure 4:
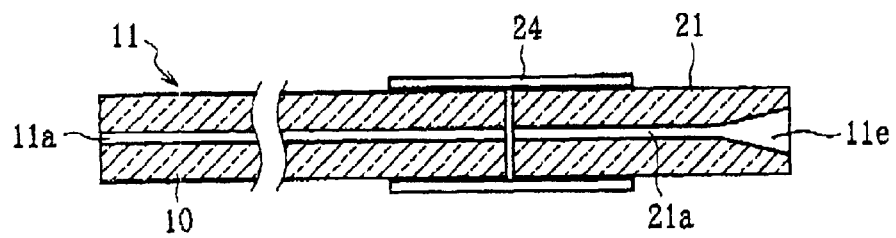
Figure 4:
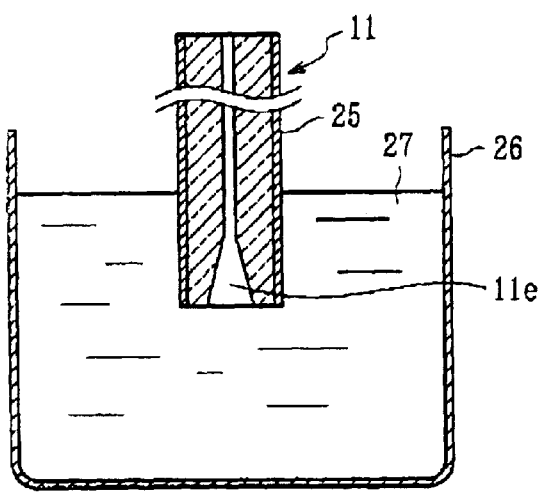

Then, as shown in FIG. 4(A), a tool 20 whose front end with sintered diamond abrasive grains has an angle of approximately 90° is rotated at a high speed and the end face is cut and processed around the axis of the inner hole 11a, whereby a substantially conical flare portion 11e is formed and the long capillary tube 11 shown in FIG. 1 is manufactured.

Alternatively, as shown in FIG. 4(B), a construction may be employed, wherein the end portion of a glass capillary tube 10 and one end of a capillary tube 21 having a substantially conical flare portion at the other end are press-fitted from both ends of the split sleeve, respectively and butted with each other in the split sleeve 24, and the inner hole 21a of the capillary tube 21 is aligned with the inner hole 11a of the long capillary tube 11, whereby the flare portion 11e is fitted and provided on the end portion of the long capillary tube 11.

Alternatively, as shown in FIG. 4(C), a construction may be employed, wherein while the outer surface of the glass capillary tube 10 (not illustrated) is protected by an acid-resistant film 25, the end portion is immersed in a glass-erosive agent 27 contained in the etching tank 26, whereby a substantially conical flare potion 11e is formed at the end portion of the long capillary tube 11.

Figure 5:
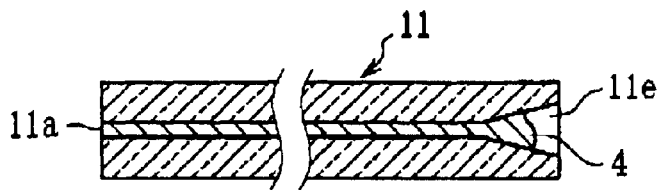
Figure 5:
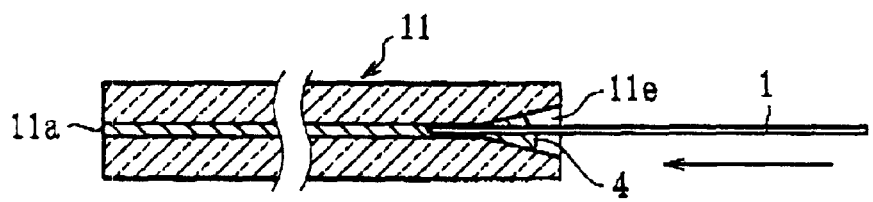
Figure 5:
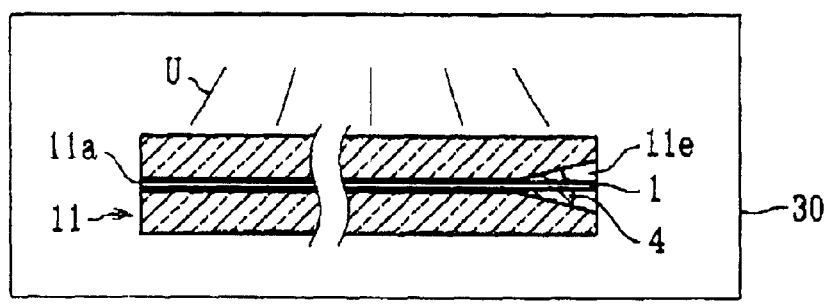
Figure 5:
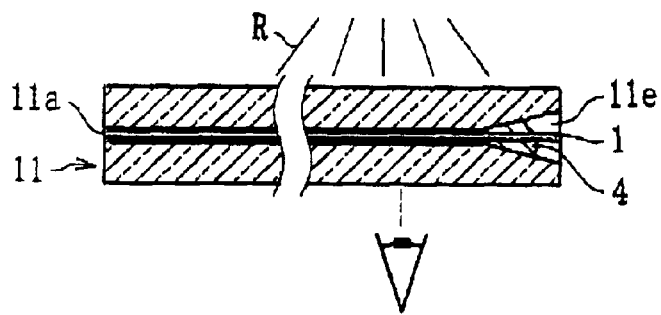

As shown in FIG. 5(A), first, the adhesive 4 is filled into the inner hole 11a of the manufactured long capillary tube 11 beforehand by utilizing capillary phenomena, a vacuum aspirator, or pressure injector, then as shown in FIG. 5(B), the optical fiber 1 whose covering has been removed is inserted through a flare portion 11e. At this time, while inserting the optical fiber 1, the adhesive 4 is uniformly filled in the gap between the inner hole 11a and optical fiber 1 so as not to create air bubbles. Thereafter, the adhesive 4 is cured and the optical fiber 1 is fixed in the long capillary tube 11.

Figure 6:
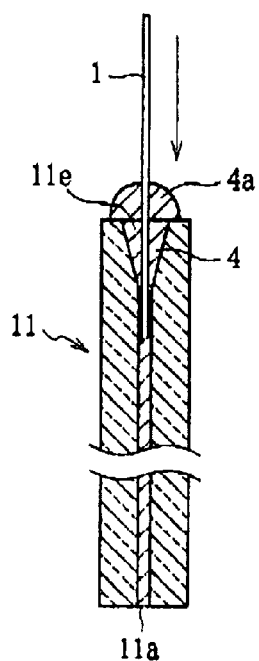
Figure 6:
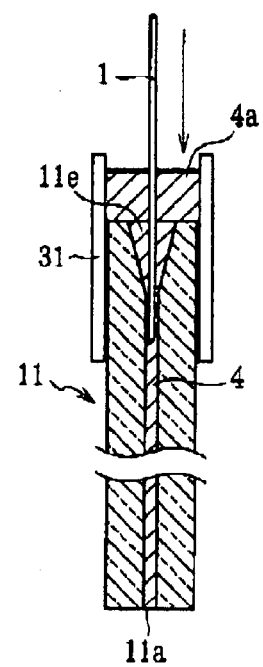

As shown in FIG. 6(A), the adhesive heap 4a is formed by applying a large amount of adhesive 4 on the flare portion 11e of the capillary tube 11, or as shown in FIG. 6(B), the adhesive heap 4a is held by fitting a transparent member 31 on the capillary tube 11, thus making it possible to reduce air bubbles and the like which generate in the gap between the inner hole 11a of the capillary tube and optical fiber 1 during the optical fiber 1 insertion.

When the optical fiber 1 is fixedly fitted, when the long capillary tube 11 is made of borosilicate glass which allows, at a thickness of 1 mm, light having a wavelength of 350 nm–500 nm to penetrate therethrough at 80% or more, as shown in FIG. 5(C) the photo-curing adhesive 4 having sensitivity to predetermined light from ultraviolet rays to blue visible rays can be used, therefore the optical fiber 1 can be fixed in a short time of several tens of seconds by irradiating, for example, an ultraviolet ray U having approximately 350 nm.

In addition, if the adhesive 4 is heat-curable, as shown in FIG. 5(C), the adhesive 4 inside the long capillary tube 11 is cured in a heating oven 30 which has been programmed to have a predetermined temperature schedule. In such a case, for example, if the adhesive which cures by being maintained at 100° C. for one hour or more is used, the adhesive is maintained at 20–70° C. for five hours or more and cured at 100° C. or more and during the time of temperature-fall, the adhesive is maintained 70–20° C. for one hour or more. Thus, contraction stress and creation of air bubbles generated when the adhesive cures can be reduced.

After the optical fiber 1 is adhered, as shown in FIG. 5(D), in terms of the long capillary tube 11 made of crystallized glass which allows, at a thickness of 1 mm, light having a wavelength of 700 nm–2500 nm to penetrate therethrough at 20% or more, light R having a wavelength 700–2500 nm is irradiated from a light source (not illustrated) and made irradiate through the long capillary tube 11, and transmitted light or a transmitted image therethrough is observed through a visual inspection or a sensor, whereby the state and failure of the adhesive 4 between the long capillary tube 11 and optical fiber 1 can be inspected.

In the above embodiment, the capillary tube of the preliminary member with optical fiber is a straight tube, however, annular V-grooves may be provided on the outer circumference surface beforehand at predetermined length pitches that enables forming of optical devices and a capillary tube in such a condition may be provided with a compressive stress layer for reinforcement and used. Also, the diameter of the preliminary member with optical fiber may be 2.5 mm and the like except for 1.25 mm.

In a case of the capillary tube 11 made of crystallized glass having the composition shown in Table 1, compared to a capillary tube made of ceramic, the polishability is close to that of the optical fiber 1 and the end face may be polished using a low-price polishing film containing alumina, chromium oxide, iron oxide and the like. The expensive diamond polishing film or unhandy slurry is unnecessary. After cutting the capillary tube 11 with the optical fiber fixedly fitted, both end faces are polished using an alumina polishing film for rough polish, a chromium oxide polishing film for polish to form spherical surfaces, and a iron oxide polishing film for finishing polish, thus polished end faces with low reflection can be obtained.

Owing to the effects of crystals deposited on the surface, the crystallized glass capillary tube 11 has sufficient abrasion resistance even when it is used as an optical connector and the material characteristics and optical characteristics thereof do not change after 500 repetitions of inserting and with drawing operations with respect to an adapter with a zirconia split sleeve. The same applies to a case where the capillary tube 11 is used in a mode such as the optical device 5. In addition, in the case of a glass capillary tube, scratches occur after about 10 repetitions of inserting and withdrawing operations, and both material strength and optical characteristics are degraded.

When the external shape of the long capillary tube 11 is a polygonal-columnar shape such as a tetragonal prism and a hexagonal prism, by diagonally polishing the capillary tube while taking one edge thereof as a standard, the direction of the diagonal polish can be easily confirmed during assembly, therefore assembly becomes easy. In order to form a polygonal-columnar shape, a preform formed by drawing is processed into, a polygonal shape beforehand and the said shape is maintained, or a cylindrical capillary tube may be processed after drawing formation.

Furthermore, in a case where the external shape of the long capillary tube 11 is cylindrical and a flat portion or a groove portion extending in the longitudinal direction thereof is provided, when one portion of the outer circumference of the capillary tube 11 is flatly scraped away in the longitudinal direction or grooving is performed on one portion of the outer circumference, the same effects as those of the aforementioned polygonal-columnar shape can be provided. Moreover, the above shape can be manufactured by either drawing formation or post processing.

Figure 7:
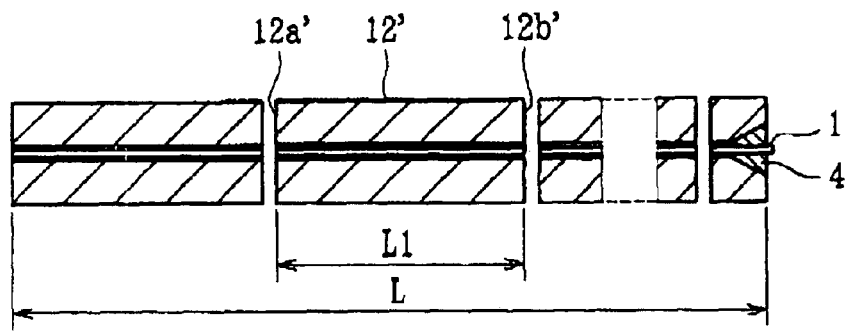
Figure 7:
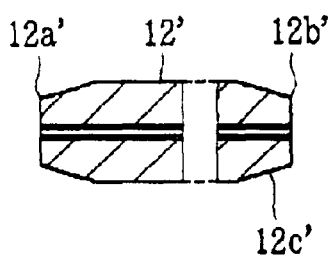
Figure 7:
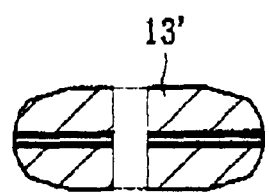
Figure 7:
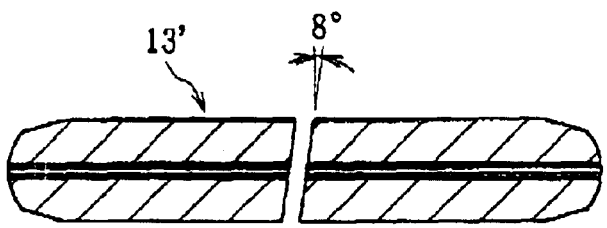
Figure 7:
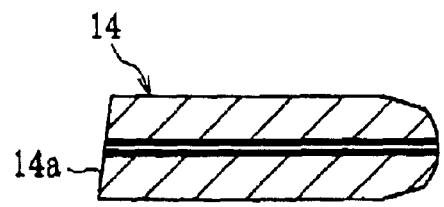
Figure 10:
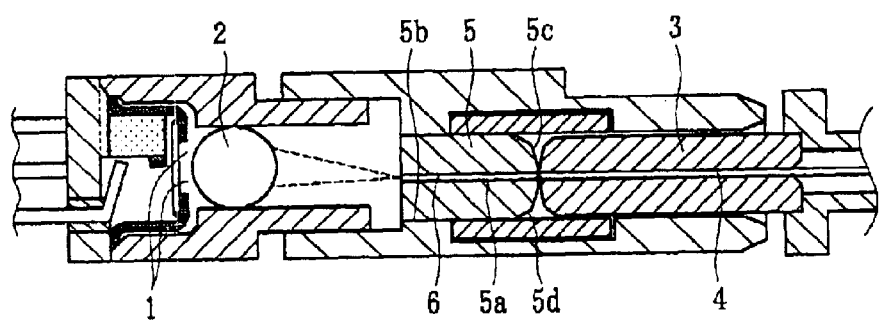
FIG. 10 is an explanatory view of an optical fiber stub used for an optical module.

FIGS. 7 show a mode where an optical fiber stub is manufactured from the aforementioned preliminary member (long capillary tube 11 with optical fiber).

First, a preliminary member having an overall length of approximately 250 mm is cut and 20 capillary tubes with optical fiber 12' each having an overall length L1 of 12.5 mm (predetermined length: 6 mm×2+cutting margin: 0.4 mm+polishing margin 0.1 mm) is formed. Then, both end faces 12a', and 12b' of each capillary tube 12' with optical fiber are processed and provided with 45° C-chamfer 12C', a corner portion created by the C-chamfer 12c', and the side surface is rounded. Then, the both end faces 12a' and 12b' are PC-polished to become convex spherical surfaces, whereby a member with optical fiber 13' is manufactured.

Then, as shown in FIG. 7(D), the member with optical fiber 13' is cut at its center with an angle of 8° with respect to a surface perpendicular to the central axis. Then, the 8° inclined portion thus cut is polished to become a specular surface and an inclined surface 14a is formed, thus an optical fiber stub 14 is manufactured.

Alternatively, the end face 12a' of the capillary tube with optical fiber 12' having an overall length L1 of 6 mm is provided with a C-chamfer 12c' of 45°, the corner portion created by the C-chamfer 12c' and the side surface is rounded, and the end face 12a' is PC-polished to become a convex spherical surface. The end face 12b' is diagonally polished to have an angle of 8° and, finally, it is polished to become a specular surface so as to complete the inclined surface 14a, thus an optical fiber stub 14 is manufactured.

The optical fiber stub 14 thus manufactured is built in a housing provided with members having precisely aligning functions such as a receptacle and a split sleeve, thus an optical device is constructed.

TABLE 1

| | | Sample No. | | | | |
|---|---|---|---|---|---|---|
| | | 1 | 2 | 3 | 4 | 5 |
| Composition (Weight %) | SiO$_2$ | 57.8 | 66.3 | 67.4 | 64.3 | 65.9 |
| | Al$_2$O$_3$ | 24.6 | 18.2 | 16.6 | 18.0 | 18.2 |
| | Li$_2$O | 2.7 | 2.3 | 2.3 | 2.5 | 2.0 |
| | K$_2$O | 7.0 | 3.4 | 3.5 | 5.0 | 3.4 |
| | TiO$_2$ | 2.8 | 1.8 | 3.0 | 3.0 | 1.5 |
| | ZrO$_2$ | 3.2 | 1.8 | 1.8 | 2.0 | 1.8 |
| | ZnO | 1.0 | 3.1 | 2.0 | 3.1 | 3.6 |
| | MgO | — | 1.0 | 1.0 | 1.0 | 1.5 |
| | CaO | — | — | — | 0.4 | 0.6 |
| | BaO | — | — | — | 0.5 | 1.4 |
| | B$_2$O$_2$ | — | — | 2.0 | — | — |
| | Na$_2$O | 0.4 | — | — | — | — |
| | P$_2$O$_5$ | — | — | 0.4 | — | — |
| | As$_2$O$_3$ | 0.5 | — | — | 0.2 | 0.1 |
| | Bi$_2$O$_3$ | — | 2.1 | — | — | — |
| Condition of crystallization (° C.) | | | | | | |
| Temperature of nucleation | | 780 | 780 | 790 | 780 | 780 |
| Temperature of crystal growth | | 1000 | 1000 | 980 | 1050 | 1000 |
| Main crystal | | β-silica solid solution | β-spodumene solid solution | β-spodumene solid solution | β-spodumene solid solution | β-spodumene solid solution |

What is claimed is:

1. A preliminary member of an optical device component with optical fiber comprising a long capillary tube made of glass or crystallized glass end an optical fiber inserted and fixed in an inner hole of the long capillary tube,
the preliminary member made up of a plurality of contiguous short capillary tubes with optical fibers each of which composes an optical device component to be connected to an optical connector, wherein the short capillary tubes of the plurality are seperated by cutting the preliminary member.

2. A preliminary member of an optical device component with optical fiber as set forth in claim 1, wherein the overall length thereof is 20 mm or more.

3. A preliminary member of an optical device component with optical fiber as set forth in claim 1, wherein the long capillary tube is made of glass or crystallized glass having a coefficient of linear expansion less than 7×10$^{-6}$/K.

4. A preliminary member of an optical device component with optical fiber as set forth in claim 1, wherein the long capillary tube is made of glass or crystallized glass which allows, at a thickness of 1 mm, light having a wavelength of 350 nm–500 nm to penetrate therethrough at 50% or more, and wherein the optical fiber is fixed in an inner hole of the long capillary tube with an adhesive, the adhesive being an ultraviolet-curing adhesive.

5. A preliminary member of an optical device component with optical fiber as set forth in claim 1, wherein the long capillary tube is made of crystallized glass which has composition of 55–72% of SiO$_2$, 16–30% of Al$_2$O$_3$, 1.5–2.8% of Li$_2$O, 0–2.5% of MgO, 1.3–5.0% of TiO$_2$, 0–4% of ZrO$_2$, 2.0–9% of TiO$_2$+ZrO$_2$,2.1–10% of K$_2$O, 0–10% of ZnO, 0–6% of BaO, 0–4% of CaO, 0–7% of B$_2$O$_3$,0–4% of Na$_2$O, 0–0.9% of P$_2$O$_5$,0–3% of As$_2$O$_3$, and 0–3% of Sb$_2$O$_3$ based on percentage by mass, and where a β-spodumene solid solution or a β-silica solid solution has been deposited at 30–70% by volume as the main crystals.

6. A preliminary member of an optical device component with optical fiber as set forth in claim 1, wherein the long capillary tube is made of crystallized glass which allows, at a thickness of 1 mm, light having a wavelength of 700 nm–2500 nm to penetrate therethrough at 30% or more.

7. A preliminary member of an optical device component with optical fiber as set forth in claim 1, wherein the long capillary tube is manufactured by a drawing formation method.

8. A preliminary member of an optical device component with optical fiber as set forth in claim 1, wherein the long capillary tube comprises a flare portion at an end portion of the inner hole for guiding the optical fiber.

9. A preliminary member of an optical device component with optical fiber as set forth in claim 1, wherein the long capillary tube has mechanical strength which has been enhanced by creating a compressive stress layer on the surface thereof.

10. A preliminary member of an optical device component with optical fiber as set forth in claim 1, wherein an external surface of the long capillary tube is polygonal.

11. A preliminary member of an optical device component with optical fiber as set forth in claim 1, wherein an external surface of the long capillary tube is cylindrical and provided with a flat portion or a groove portion extending in the longitudinal direction.

12. A preliminary member of an optical device component with optical fiber as set forth in claim 1, wherein the optical device component is a component for an optical fixed attenuator arid the optical fiber has a predetermined light attenuation factor.

13. A method for manufacturing a preliminary member of an optical device component with optical fiber, the preliminary member will produce, by cutting, a plurality of short capillary tubes with optical fibers each of which composes an optical device component to be connected to an optical connector, comprising the steps of:
manufacturing a long capillary tube by forming softened glass or crystallized glass;
providing a substantially conical flare portion at an end portion of the long capillary tube for guiding the optical fiber to an inner hole of the long capillary tube;
filling an adhesive into the inner hole of the long capillary tube;
inserting a long optical fiber whose covering has been removed into the inner hole through the flare portion; and
curing the adhesive to fix the optical fiber in the long capillary tube.

14. A method for manufacturing a preliminary member of an optical device component with optical fiber as set forth in claim 13, wherein a compressive stress layer is formed on the surface of the long capillary tube by a quenching method.

15. A method for manufacturing a preliminary member of an optical device component with optical fiber as set forth in claim 13, wherein a compressive stress layer is formed on the surface of the said long capillary tube by an ion exchanging method.

16. A method for manufacturing a preliminary member of an optical device component with optical fiber as set forth in claim 13, wherein the substantially conical flare portion is formed by cutting an end face of the long capillary tube around the center of the inner hole by a rotating tool whose front end provided with abrasive particles has an angle of 45–120°.

17. A method for manufacturing a preliminary member of an optical device component with optical fiber as set forth in claim 13, wherein the substantially conical flare portion is formed by immersing the end portion of the long capillary tube into a glass corrosive solution while protecting the outer surface of the long capillary tube.

18. A method for manufacturing a preliminary member of an optical device component with optical fiber as set forth in claim 13, wherein the flare portion is fitted to the end portion of the long capillary tube by butting the end portion of the long capillary tube and one end of a capillary tube having a substantially conical flare portion at the other end thereof with each other in a split sleeve to align the inner hole of the long capillary tube and an inner hole of the capillary tube with each other.

19. A method for manufacturing a preliminary member of an optical device component with optical fiber as set forth in claim 13, wherein an adhesive heap is formed when the adhesive is filled into the inner hole of the long capillary tube, the adhesive heap including no air bubbles and fills at least the flare portion.

20. A method for manufacturing a preliminary member of an optical device component with optical fiber as set forth in claim 19, where the adhesive heap is supported by a transparent member, and wherein the optical fiber is inserted into the inner hole of the long capillary tube while observing the optical fiber.

21. A method for manufacturing a preliminary member of an optical device component with optical fiber as set forth in claim 13, wherein the surface of the long optical fiber whose covering has been removed is cleaned.

22. A method for manufacturing a preliminary member of an optical device component with optical fiber as set forth in claim 13, wherein the long capillary tube is made of crystallized glass which allows, at a thickness of 1 mm, light having a wavelength of 350nm–500nm to penetrate therethrough at 50% or more, and a photo-curing adhesive is filled in the inner hole of the long capillary tube, and wherein after inserting a long optical fiber whose covering has been removed into the inner hole of the long capillary tube through the flare portion, the adhesive is cured by exposure to light, whereby the long optical fiber is fixed in the long capillary tube.

23. A method for manufacturing a preliminary member of an optical device component with optical fiber as set forth in claim 13, wherein a heat-curing adhesive is filled in the inner hole of the long capillary tube, and wherein after inserting a long optical fiber whose covering has been removed into the inner hole of the long capillary tube through the flare portion, the adhesive is cured by heating, whereby the long optical fiber is fixed in the long capillary tube.

24. A method for manufacturing a preliminary member of an optical device component with optical fiber as set forth in claim 13, wherein the long capillary tube is made of crystallized glass which allows, at a thickness of 1 mm, light having a wavelength of 700 nm–2500 nm to penetrate therethrough at 30% or more, and wherein an adhering failure to the optical fiber is inspected by irradiating light having a wavelength of 700 nm–2500 nm to the long capillary tube with optical fiber fixed in the inner hole thereof with the adhesive and observing transmitted light or a transmitted image therethrough.

25. An optical fiber stub manufactured by a manufacturing method, the optical fiber stub connected to an optical connector, the method comprising the steps of:

forming softened glass or crystallized glass into a long capillary tube;

inserting and fixing a long optical fiber into an inner hole of the long capillary tube along almost the entire length of the inner hole to manufacture a long capillary tube with optical fiber;

cutting the long capillary tube with optical fiber into a plurality of first capillary tubes with optical fibers each of which has a predetermined length; and polishing end faces of the first capillary tube with optical fiber.

26. An optical fiber stub as set forth in claim 25, wherein the end faces of the first capillary tube with optical fiber is PC-polished.

27. An optical fiber stub as set forth in claim 26, wherein one end face of the first capillary tube with optical fiber is PC-polished and the other end face is polished so as to be an inclined surface which forms an angle of 0–30 with respect to a surface perpendicular to the central axis of the first capillary tube.

28. An optical fiber stub as set forth in claim 26, wherein the method further comprises the steps of:

PC-polishing the end faces of the first capillary tube with optical fiber;

cutting the first capillary tube with optical fiber at inclined surfaces each of which forms an angle of 0–30° with respect to a surface perpendicular to the central axis of the first capillary tube, whereby manufacturing second and third capillary tubes with optical fiber each of which has a predetermined length; and polishing the inclined surfaces of the second and third capillary tubes with optical fiber.

29. An optical fiber stub as set forth in claim 25, wherein a coefficient of linear expansion of the long capillary tube is less than $7 \times 10^{-7}$/K.

30. An optical fiber stub as set forth in claim 25, wherein a compressive stress layer is formed on the surface of the long capillary tube by a quenching method or an ion exchanging method.

31. An optical fiber stub as set forth in claim 25, wherein the long capillary tube is made of glass or crystallized glass which allows, at a thickness of 1 mm, light having a wavelength of 350 nm–500 nm to penetrate therethrough at 50% or more, and wherein the optical fiber is fixed in the inner hole of the long capillary tube with an adhesive, the adhesive being a photo-curing adhesive, and cured by exposure to light.

32. An optical fiber stub as set forth in claim 25, wherein the long capillary tube is made of crystallized glass which allows, at a thickness of 1 mm, light having a wavelength of 700 nm–2500 nm to penetrate therethrough at 30% or more, and wherein an adhering failure to the optical fiber is inspected by irradiating light having a wavelength of 700 nm–2500 nm to the long capillary tube with optical fiber fixed in the inner hole thereof with an adhesive and observing transmitted light or a transmitted image therethrough.

* * * * *